United States Patent Office 3,808,240
Patented Apr. 30, 1974

3,808,240
PRODUCTION OF 11-CYANOUNDECANOIC ACID
Terence Washford North, Southgate, Wales, assignor to BP Chemicals Limited, London, England
No Drawing. Filed July 28, 1971, Ser. No. 167,033
Claims priority, application Great Britain, Sept. 7, 1970, 42,657/70
Int. Cl. C07c *121/40;* C07d *85/00*
U.S. Cl. 260—404
2 Claims

ABSTRACT OF THE DISCLOSURE 11-cyanoundecanoic acid is produced by converting cyclohexanone to 1,1'-peroxydicyclohexylamine, followed by pyrolysis of the peroxyamine, the cyclohexanone by-product from the pyrolysis stage being recycled to the first stage after purification to reduce the nitrile content.

---

The present invention relates to a process for the production of 11-cyanoundecanoic acid from 1,1'-peroxydicyclohexylamine and recycle of the cyclohexanone by-product of this reaction as a feed material for the preparation of the peroxyamine starting material.

It is known to prepare 1,1'-peroxydicyclohexylamine by reacting cyclohexanone, hydrogen peroxide and ammonia in the presence of a catalyst and a stabilizer. Various catalysts are known for this process, notably the ammonium salt of inorganic and organic carboxylic acids. Of these, best results are achieved by using ammonium nitrate. It is also well known to employ various salts and/or complexes of ethylene diamine tetra-acetic acid as stabilizers for this reaction. These stabilizers include, the di- and tetra-sodium salts of ethylene diamine tetra-acetic acid, and the aluminum, zinc, barium, nickel, lanthanum and like complexes of the disodium salt.

The 1,1'-peroxydicyclohexylamine thus produced may be converted to 11-cyanoundecanoic acid by pyrolyzing the peroxydicyclohexylamine at elevated temperatures at atmospheric or super atmospheric pressures.

Hitherto the cyclohexanone used for preparing the starting material for this process has been supplied from an independent source. The use of the cyclohexanone by-product from the pyrolysis stage directly appeared to be uneconomical since this reduced the yield of 1,1'-peroxydicyclehexylamine markedly. This was attributed mainly to impurities present in the cyclohexanone and hence recourse to elaborate methods of separation and purification of the cyclohexanone had to be undertaken before it could be re-employed as a feed for the production of 1,1'-peroxydicyclohexylamine.

Surprisingly, it has now been found that improved yields of 1,1'-peroxydicyclohexylamine can be obtained by a partial separation of the nitriles and other impurities present in the cyclohexanone by-product using any of the conventionally known techniques.

According to the present invention the process for the production of 11-cyanoundecanoic acid comprises converting cyclohexanone to 1,1'-peroxydicyclohexylamine, follower by pyrolyzing the 1,1'-peroxydicyclohexylamine to produce 11-cyanoundecanoic acid and recycling the cyclohexanone as feed to the process after purification. Cyclohexanone may be converted to 1,1'-peroxydicyclohexylamine by reacting the cyclohexanone with hydrogen peroxide to give 1,1'-dihydroxydicyclohexylperoxide followed by a reaction of the 1,1'-dihydroxydicyclohexylperoxide with ammonia. Alternatively, the cyclohexanone may be converted to 1,1'-peroxydicyclohexylamine in a single step by simultaneous reaction of hydrogen peroxide and ammonia.

11-cyanoundecanoic acid may be produced by feeding 1,1'-peroxydicyclohexylamine in the form of liquid droplets into a gas, inert under the reaction conditions, and maintained at elevated temperature in an unpacked substantially adiabatic reactor at a pressure in the range of 30 mm. Hg to 3 atmospheres absolute.

The gas into which the liquid droplets of 1,1'-peroxydicyclohexylamine may be fed for pyrolysis can be any gas which is inert under the reaction conditions. Examples of suitable gases are nitrogen, steam and flue gases.

1,1'-peroxydicyclohexylamine may be obtained in the form of liquid droplets by any convenient method, these droplets may consist substantially only of the peroxydicyclohexylamine but may contain other materials. The peroxydicyclohexylamine may be produced in the form of liquid droplets by spraying it in the liquid phase into the reactor. For example 1,1'-peroxydicyclohexylamine may be converted into droplets by atomizing a stream of the peroxydicyclohexylamine in the liquid phase by the action of a stream of gas maintained at elevated temperatures. Atomization is achieved in the same way as the well-known scent-spray and suitable atomizers will be known to those skilled in the art. Alternatively, the liquid droplets may be produced by forcing the peroxydicyclohexylamine in the liquid phase through a suitable spray without the action of a gas stream being required to cause atomization. Other types of atomizer e.g. rotating cup atomizers may also be used.

Temperatures at which the gas is maintained in the reactor may vary over a moderately wide range. Thus temperatures in the range 250° C.–1000° C. may be used. The lower temperature limit is preferably 300° C. while the upper limit is preferably 600° C. It is to be understood that these temperatures refer to the reaction zone and not to the temperatures of any gas stream before it enters the zone. The residence time of the peroxydicyclohexylamine in the reactor may vary over a moderately wide range. Examples of suitable times are those in the range of 0.05 second to 5 seconds.

The gas inert under the reaction conditions is preferably fed to the reaction zone at a rate such that the mole ratio of the inert gas to the peroxydicyclohexylamine is in the range 5:1 to 500:1.

The reaction products of this pyrolysis stage comprises 11-cyanoundecanoic acid, cyclohexanone, some nitriles and other minor by-products. The cyclohexanone may be separated and recovered for recycle from 11-cyanoundecanoic acid, which is the main product of the pyrolysis reaction, and some of the less volatile impurities by any of the conventional techniques. For example, this may be separated by distillation in the presence of water, namely the water used in the pyrolysis reaction as diluent. The azeotrope which passes overhead may be cooled and allowed to separate into two layers. The lower aqueous layer may be continuously returned to the head of the column as reflux and the upper, cyclohexanone layer may be continuously removed. This cyclohexanone layer is contaminated with the nitriles and other minor impurities the exact amount of these depending on the efficiency of the distillation. If further purification of this cyclohexanone is desired it can be continuously fractionated in an efficient column (e.g. Oldershaw column, 10 plates rectifying section, 25 plates stripping section, reflux ratio approx. 3–4:1). The amount of the nitriles and other impurities in the recovered cyclohexanone may thereby be reduced to approx. 0.5% w./w. by this process.

The impurity responsible for the decrease in the yield of 1,1'-peroxydicyclohexylamine when impure cyclohexanone is recycled has not been identified. The effect of the impurities in the cyclohexanone feed, however, appears to be proportional to the amount of nitriles present in the cyclohexanone feed. For example, if the amount of nitriles present in the cyclohexanone feed can be regulated to below 0.5% w./w., based on the total weight of the cyclohexanone feed, up to 90% yield of 1,1'-peroxydicyclohexylamine may be obtained with the nominal concentration (0.08% w./w.) of the sodium salt of ethylene diamine tetraacetic acid as stabilizer. This yield may also be maintained when more than 0.5% w./w. nitriles are present in the cyclohexanone, providing that the stabilizer concentration is correspondingly increased. Thus, although the exact nature of the offending component is not known, it appears possible to control the efficiency of the process by regulating the nitrile content in the cyclohexanone feed.

The recovered cyclohexanone may be mixed with about 3 volumes of fresh cyclohexanone and the mixture then fed to the first stage for the preparation of 1,1'-peroxydicyclohexylamine. Alternatively, the impure cyclohexanone layer containing a major portion of the nitriles and other impurities may be mixed with fresh cyclohexanone before distillation for the partial removal of the nitriles and the impurities is carried out.

It has been observed that if the cyclohexanone feed to the first stage of the preparation of 1,1'-peroxydicyclohexylamine contains less than 0.5% w./w. of nitriles, preferably between 0.05% and 0.2% w./w., based on the total weight of the cyclohexanone feed, best yields of the peroxydicyclohexylamine are obtained. The purification of the cyclohexanone produced in the pyrolysis of the peroxydicyclohexylamine can obviously be effected in a number of ways of which the one outlined above is only a preferred example.

Further embodiments of the present invention are illustrated in the following examples. In these examples any reference to the regulation of the nitrile concentration in the cyclohexanone feed is also meant to cover the regulation of the concentration of the offending component in the cyclohexanone feed.

EXAMPLE 1

Recovery of cyclohexanone from pyrolysis product 3935 g. of crude 1,1'-peroxydicyclohexylamine, containing 3463 g. of the peroxide and 354 g. of cyclohexanone, were fed over 50 minutes together with 5500 l./hr. of steam through a tubular reactor maintained at 500° C. The residence time was 0.19 second. The products separated into an organic phase containing 1896 g. of 11-cyanoundecanoic acid, 382 g. of caprolactam, 58 g. of a mixture of hexanoic and hexenoic acids and 738 g. of cyclohexanone, and an aqueous phase containing 140 g. of caprolactam and approximately 100 g. of cyclohexanone. Both phases were fed to the top of a 25 plate Oldershaw column. The column overheads separated into two phases and the organic phase was removed to yield 996 g. of product containing 836 g. of cyclohexanone and 54 g. of a mixture of nitriles.

Purification of cyclohexanone

Recovered cyclohexanone containing 5.4% of a mixture of nitriles was fed to the 25th plate of a 35 plate Oldershaw column. The product collected overhead contained 0.62% of nitriles and, mixed with makeup cyclohexanone, was used for the preparation of the 1,1'-peroxydicyclohexylamine.

Preparation of 1,1'-peroxydicyclohexylamine using purified, recycled cyclohexanone Cyclohexanone (2.13 moles/hr.; containing 0.05% nitriles from the addition of the steam distilled product of crude nitrile acid to fresh cyclohexanone) ammonia solution (e.g. 0.880; 2.8 moles/hr. $NH_3$) and hydrogen peroxide solution (39% w./w.; 1.13 moles/hr.) were pumped continuously to a two stage cascade system. The ammonia solution contained ammonium nitrate as catalyst (6.1% w./w. of total reaction mixture) and the aluminium complex of disodium ethylene diamine tetraacetic acid as stabilizer (0.08% w./w. of total reaction mixture). Both reactors were maintained at 30° C. and the levels were adjusted to give a total residence time of 9 hr. The yield of peroxyamine was 90% w./w. based on cyclohexanone.

As a comparison with the above example reaction was carried out under the same conditions as above but with 5% nitriles in the cyclohexanone feed, the yield dropped to 81%.

EXAMPLE 2

A further experiment was carried out under the conditions of Example 1 above except that disodium ethylene diamine tetra-acetic acid was fed as stabilizer, instead of the aluminium complex in ammonia (0.08% w./w. of total reaction mixture) and the cyclohexanone feed contained 1.4% nitriles. The yield of peroxyamine was 90%.

Pyrolysis of 1,1'-peroxydicyclohexylamine prepared from recycled cyclohexanone 3757 g. of crude peroxyamine, containing 3006 g. of the peroxide and 49 g. of nitriles, were fed over 80 minutes together with 4400 l./hr. of steam through a tubular reactor maintained at 500°. The residence time was 0.24 second. The products contained 1568 g. of 11-cyanoundecanoic acid, 459 g. of caprolactam and 70 g. of a mixture of hexanoic and hexenoic acids.

I claim:

1. In the process for the production of 11-cyanoundecanoic acid in which cyclohexanone is converted to 1,1'-peroxydicyclohexylamine and the 1,1'-peroxydicyclohexylamine thereby produced is pyrolyzed to produce 11-cyanoundecanoic acid as the principal product and cyclohexanone as a by-product, the improvement comprising purifying the cyclohexanone by-product so that it contains less than 0.5% by weight of nitriles and recycling the purified cyclohexanone for conversion to 1,1'-peroxydicyclohexylamine.

2. A process according to claim 1 wherein the recycled cyclohexanone feed after purification contains less than 0.2% by weight of nitriles.

References Cited

UNITED STATES PATENTS 3,654,268  4/1972  Hawkins _____ 260—239.3 A

FOREIGN PATENTS 1,534,214  7/1968  France.

OTHER REFERENCES

Hawkins: J. Chem. Soc., No. 19 (1969), pp. 2663–70.

ELBERT L. ROBERTS, Primary Examiner

D. G. RIVERS, Assistant Examiner

U.S. Cl. X.R.

260—239.3 R, 239.3 A, 307 F